United States Patent [19]
Powell

[11] 3,958,292
[45] May 25, 1976

[54] ROLLER FOR CLEANING PHONOGRAPH RECORDS

[75] Inventor: Cecil Powell, Hazel Grove, England

[73] Assignee: Milty Products Limited, Stockport, England

[22] Filed: Dec. 26, 1974

[21] Appl. No.: 536,647

[30] Foreign Application Priority Data
Nov. 11, 1974  United Kingdom............... 48676/74

[52] U.S. Cl............................. 15/104 A; 15/230.11; 274/47
[51] Int. Cl.²...................... A47L 25/00; G11B 3/58
[58] Field of Search.................... 15/104 A, 230.11; 134/6; 274/47; 428/343, 351, 906; 29/110.5

[56] References Cited

UNITED STATES PATENTS

| | | | |
|---|---|---|---|
| 2,311,481 | 2/1943 | Sinclair | 274/47 |
| 2,545,700 | 3/1951 | MacKey | 15/230.11 |
| 2,787,014 | 4/1957 | Barry | 15/104 A |
| 3,158,887 | 12/1964 | Kanbar et al. | 15/230.11 X |
| 3,177,512 | 4/1965 | Balaban | 15/104 A |
| 3,192,548 | 7/1965 | Wilbrecht | 15/104 A |
| 3,225,373 | 12/1965 | Kisbany | 15/104 A |
| 3,682,690 | 8/1972 | Amos et al. | 15/104 A |

FOREIGN PATENTS OR APPLICATIONS

| | | | |
|---|---|---|---|
| 92,129 | 11/1961 | Denmark | 15/104 A |
| 982,599 | 2/1965 | United Kingdom | 274/47 |
| 1,175,904 | 7/1964 | Germany | 15/184 |
| 891,740 | 3/1962 | United Kingdom | 15/104 A |

*Primary Examiner*—Daniel Blum
*Attorney, Agent, or Firm*—Shoemaker and Mattare, Ltd.

[57] ABSTRACT

A means for use in cleaning a gramophone record comprising moving a roller having an adhesive tape applied to the surface thereof across and in contact with the face of the record to be cleaned, the bond strength between the individual particles of the adhesive substantially exceeding that between the particles and the record face and the adhesive surface being resiliently flexible.

2 Claims, 2 Drawing Figures

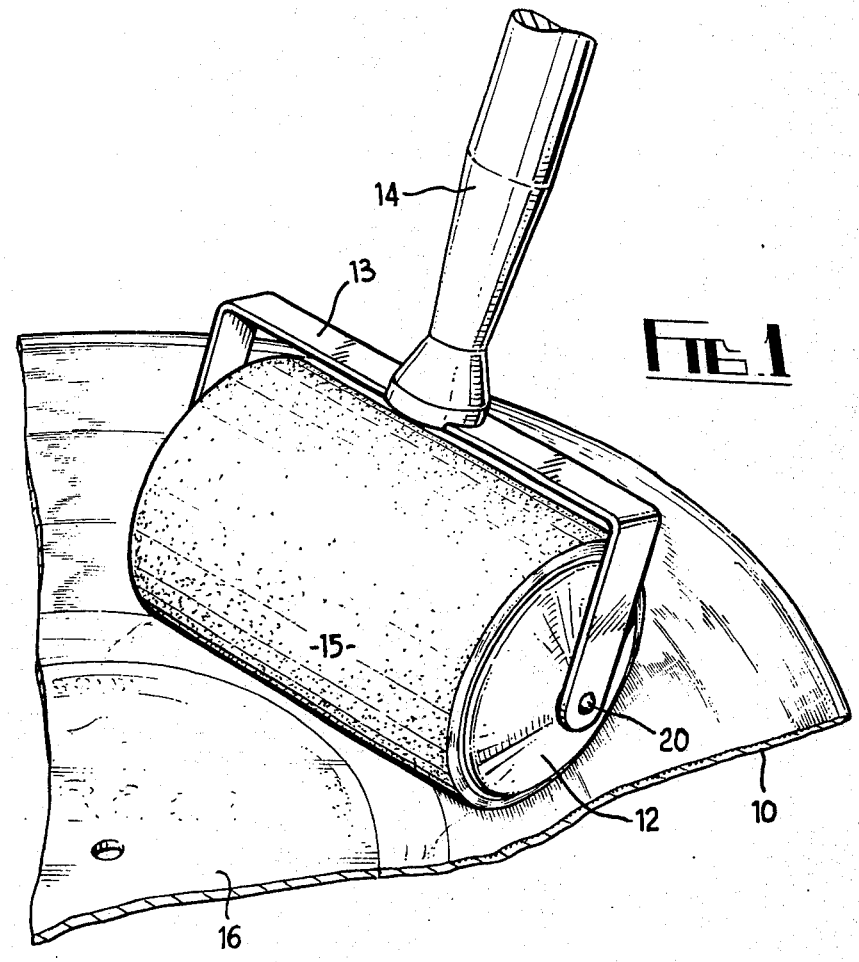
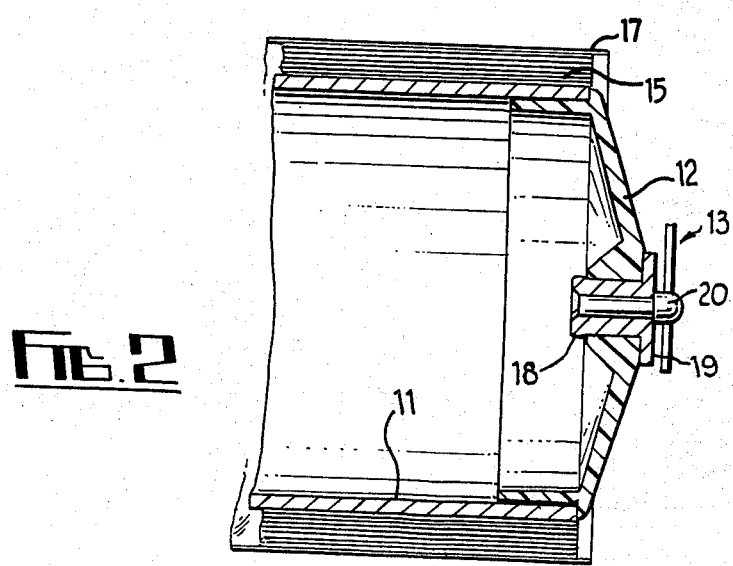

ROLLER FOR CLEANING PHONOGRAPH RECORDS

The invention concerns the removal of dirt, dust and the like, hereinafter for convenience referred to as "contaminants", and has particular reference to the removal of contaminants from gramophone records.

The presence of contaminants on gramophone records and, particularly in the grooves thereof, may well adversely affect the quality of the reproduction achieved on playing the record.

A variety of cleaning aids have been proposed for use in connection with gramophone records, varying from brushes, pads, or rollers which are intended to bear on the surface of the record directly in advance of the stylus to brushes and pads for use in cleaning the record surface prior to the application of the record to the turntable of the record player.

In the case of those structures intended to clean the record during the actual playing thereof, two conflicting considerations apply. Thus, in order to ensure that the bristles of the brush or the elements of the pile surface of the pad or roller reaches to the bottom of the grooves of the record, a relatively high pressure requires to be applied, but if the very fine balance of a sensitive record deck is not to be impaired any out of balance loadings should be avoided. In order to meet the second requirement the loading of the brush, pad or roller must be minimal, and thus, as a compromise, a reduction in the effectiveness of the cleaning operation is accepted.

Cleaning the record prior to application of such record to the turntable, herein called "remote cleaning" has much to commend it as regards effectiveness of cleaning and the total absence of any adverse out of balance static forces on the record of the kind aforesaid on the playing characteristics of the record, but such practice cannot take into account any contaminant which falls onto the record from the immediate environs of the turntable, and as regards this latter point, in situ cleaning is to be preferred.

It is to be borne in mind that with both in situ and with remote cleaning, the cleaning aid, whilst properly engaging the grooves in the record in an attempt to displace contaminants therefrom, may not be capable of satisfactorily following the lateral indentations in the walls of the groove and thus of cleaning contaminants from such indentations. Since it is the lateral indentations which determine the sound reproduced, the effective removal of contaminants therefrom is essential if contaminant originating sound distortions are to be avoided.

With both in situ and with remote cleaning with conventional aids, although much of the contaminant may well be dislodged, a part only of the total contaminant will be removed in its entirety, a substantial proportion being simply moved to a different part of the record.

The object of the present invention is to provide a method of and means for the effective remote cleaning of a record which seeks to avoid the problems met with in connection with the remote cleaning of the records as regards the displacement or dislodgement of contaminants rather than its removal in a more satisfactory manner than has been possible hitherto.

The invention is predicated upon the appreciation that having regard to the nature of the more prevalent of the contaminants, namely dust particles, there is a likelihood that such contaminants will merely be shifted by a conventional record cleaning operation to some other location on the record and that a truly effective cleaning operation requires that the contaminant be removed in a captive manner rather than being shifted to the atmosphere from whence the contaminant can readily return to the surface of the record. The need for removal rather than dislodgement and the inadequacy of conventional aids in this regard has been recognised in that it has already been proposed to use electro-statically treated cloths for record cleaning purposes. However, the effectiveness of such cloths is much in doubt and there has been no widespread acceptance thereof.

According to a preferred feature, the body is moved in rolling contact with the surface to be cleaned, and the adhesive surface of the body is resiliently supported on such body.

The use of an adhesively coated roller in the removal of fluff from a textile fabric, the roller being drawn across the surface to be cleaned, involves totally different considerations from those relevant to the cleaning of a gramophone record. Thus, in the case of a textile fabric, the requirement is that fluff be removed from a generally flat surface rather than from grooves in that surface, the contaminant being of macroscopic rather than microscopic proportions and being on the surface. Any deposit of adhesive on the textile fabric from the surface of the roller, whilst being undesirable, is acceptable in that the presence of what would be only minute quantities of adhesive would have no deleterious aesthetic affect on the fabric. Furthermore, the flexible characteristic of the textile fabric, be it upholstery or suiting material, are such that in use there would be a significant angle of lap of the fabric about the roller, thus providing an appreciable area of surface contact between the fabric and roller at all times. In contradistinction to the foregoing, in cleaning a gramophone record it is the contaminant within the grooves, and more especially in the lateral indentations therein, which has to be removed rather than contaminant from a planar record face. Furthermore, the consideration is to remove contaminants not only of macroscopic but also of microscopic dimensions. Most importantly, any deposit of adhesive on the surface being cleaned, no matter how minute, would be totally unacceptable in that it would modify the effective form of those lateral indentations of the groove whereat the deposit occurs and thus would be manifested as a serious distortion of the sound to be reproduced therefrom.

Thus, not only are the considerations involved in the two contexts of such different character as to suggest that a cleaning device as used in one field would not be of application in the other, but the likely depositing of adhesive on the surface under consideration would point away from the use of an adhesive coated roller in the context of record cleaning rather than towards such use.

Preferably, the body comprises a roller and the adhesive surface characteristics are defined by the surface of a tape applied to the body.

According to a further preferred feature, the resilience of the surface is derived from the resilient compressibility of the adhesive-coated tape.

According to a further preferred feature, the adhesive-coated tape is applied in multiple layers to the body.

According to a still further preferred feature, the body defines a closed cylinder rotatably supported in a handle and carried in such handle by substantially contaminant free bearings.

The invention will now be described further, by way of example only, with reference to the accompanying drawings illustrating one embodiment thereof and in which:

FIG. 1 is a diagrammatic perspective view of a cleaning device for use in practising the method of the invention and shown in position for such use; and FIG. 2 is a longitudinal section through one end of the device as shown in FIG. 1, the bracket being shown schematically in the interests of clarity.

Referring now to the drawings, a device for removing contaminants as herein defined from a gramophone record 10 comprises a roller consisting of a cylindrical sleeve 11 having removable end covers 12, a bracket 13 secured to a handle 14 and with which such sleeve is rotatably engaged, and an adhesive covering to the sleeve.

The adhesive covering is provided by the surface of a tape 15 wound around the roller sleeve in multiple turns, such multiple turns being provided for a purpose hereafter to be made apparent. The outside diameter of the sleeve 11 is at least equal to the outside diameter of the end covers 12 to ensure that the respective peripheries of the end covers are maintained out of contact with the surface being cleaned by the thickness of the tape, or the multiple layers thereof, thereby to avoid damage to the surface by the end covers.

The adhesive material as carried by the tape is of such a kind as to have a particle — particle bond strength substantially greater than the particle — record surface bond strength, thereby to ensure that there is no depositing of adhesive on the record surface, and particularly in the grooves thereof.

In use, the roller is drawn across the surface of the record, the roller being positioned with the axis thereof tangential and adjacent to the record label 16 and being moved generally radially of the record.

The resilience of the adhesive and/or the tape carrying the same will ensure that the adhesive surface is pressed into the grooves of the record and, more importantly, into the lateral depressions therein, so as to pick up any contaminants present thereat, the contaminants being picked up for retention by the surface of the tape by virtue of the adhesive characteristics thereof.

When the surface for the time being of the device becomes choked with contaminants, the outer layer of tape is peeled off and is severed, preferably by a diagonal cut, to give a clean adhesive surface for subsequent use.

An acetate cover 17 is provided to protect the adhesive surface when not in use.

As an alternative to providing a length of tape wound in multiple layers on the sleeve, a removable sleeve-like covering having an adhesive outer surface thereto may be utilised, the sleeve-like covering being discarded when choked with contaminants and being replaced by a clean such covering. It is to be borne in mind that the covering should be of such resilience in the radial direction thereof as will enable the ready engagement of the adhesive surface with the lateral surfaces of the grooves, thereby to effect satisfactory cleaning thereof.

Attention is drawn to the fact that the device as described and illustrated defines a closed cylinder and that the bearing whereby such cylinder is mounted in the handle seals the cylinder against the egress of dirt and dust.

Thus, the bearing comprises a nylon bush 18 fixedly secured to the end cap 12 and having a flange 19 which constitutes a protective washer intermediate the end cover and bracket, the bore of the bush rotatably receiving a chrome-plated metal stud 20 with which a respective end of the bracket is engaged and the arrangement being such as to avoid the creation of dust due to wear. Thus, the stud rotates with respect to the bush which is fixedly secured within the end cap to allow the sleeve to rotate with respect to the bracket arm shown schematically in FIG. 2. This non-contaminant producing arrangement is of significant importance in view of the damage which would be occasioned to the record by any particles of metal or other materials which might fall thereon from the device. For like reasons, the bracket, handle and end covers are of corrosion and wear resistant materials.

What I claim is:

1. A device for cleaning a gramophone record in a manner such that the likelihood of producing particles which are potentially dangerous to the record is substantially reduced, comprising: a cylindrical sleeve; a respective end closure at each end of such sleeve; bracket having two opposed, substantially parallel limbs thereon by and between which the sleeve is rotatably supported; a handle attached to the bracket; bearing means between each limb of the bracket and a respective end closure; each bearing means having a bush fixedly secured to the end closure, a headed stud having a body which is rotatably engaged within a bore in the said bush, the stud head extending outwardly from the end closure, and seating means on each limb of the bracket in which that end of the stud head which is remote from said end closure is fixedly secured for rotatably securing the bracket to the cylindrical sleeve, there being a protective flange on the bush located between the end cover and the stud head and extending radially outwardly therefrom and in contact with the outer surface of the end closure thereby effectively to seal the bearing, said stud head engaging said flange and said stud body being engaged in said bush bore in a manner such that wear created particles are essentially avoided and to cooperate with said seal to substantially reduce the likelihood that said bearing means will produce particles potentially dangerous to the record; said sleeve having applied thereto a tape element of the type wherein the outer surface thereof has adhesive characteristics and a bond strength to the adhesive particles substantially exceeding the bond strength between such particles and the material of the surface to be cleaned.

2. A device as claimed in claim 1 wherein the tape exists on the sleeve in multiple layers.

* * * * *